US009842518B2

(12) United States Patent
Dinescu et al.

(10) Patent No.: US 9,842,518 B2
(45) Date of Patent: Dec. 12, 2017

(54) BREATHABLE HEAT TRANSFER LABELS

(75) Inventors: Liviu Dinescu, Chatsworth, CA (US); Osman N. Tanrikulu, Denver, NC (US); Daniel J. Savident, Hertfordshire (GB)

(73) Assignee: AVERY DENNISON RETAIL INFORMATION SERVICES, LLC, Mentor, OH (US)

(*) Notice: Subject to any disclaimer, the term of this patent is extended or adjusted under 35 U.S.C. 154(b) by 607 days.

(21) Appl. No.: 12/853,429

(22) Filed: Aug. 10, 2010

(65) Prior Publication Data

US 2012/0040154 A1 Feb. 16, 2012

(51) Int. Cl.

| | |
|---|---|
| ***B32B 7/12*** | (2006.01) |
| ***G09F 3/02*** | (2006.01) |
| ***D06Q 1/12*** | (2006.01) |
| ***G09F 21/02*** | (2006.01) |
| ***D06Q 1/00*** | (2006.01) |
| *A41D 27/08* | (2006.01) |

(52) U.S. Cl.

CPC ................ *G09F 3/02* (2013.01); *D06Q 1/00* (2013.01); *D06Q 1/12* (2013.01); *G09F 21/02* (2013.01); *A41D 27/08* (2013.01); *G09F 2003/0282* (2013.01); *G09F 2021/023* (2013.01); *Y10T 428/24843* (2015.01)

(58) Field of Classification Search

None

See application file for complete search history.

(56) References Cited

U.S. PATENT DOCUMENTS

| | | | |
|---|---|---|---|
| 5,364,678 A | 11/1994 | Lumb et al. | |
| 5,418,051 A | 5/1995 | Caldwell | |
| 5,523,146 A | 6/1996 | Bodford et al. | |
| 5,653,699 A | 8/1997 | Reed et al. | |
| 6,099,944 A * | 8/2000 | Laprade et al. | 428/32.69 |
| 6,103,369 A * | 8/2000 | Lucast | A61F 13/023 428/354 |
| 6,228,486 B1 * | 5/2001 | Kittel et al. | 428/354 |
| 6,495,229 B1 * | 12/2002 | Carte et al. | 428/40.1 |
| 6,511,927 B1 | 1/2003 | Ellis et al. | |
| 6,645,887 B2 | 11/2003 | Kocinec et al. | |
| 6,897,281 B2 | 5/2005 | Lubnin et al. | |
| 7,604,856 B2 * | 10/2009 | Kronzer et al. | 428/195.1 |
| 2002/0081420 A1 * | 6/2002 | Kronzer | 428/195 |

(Continued)

FOREIGN PATENT DOCUMENTS

| | | |
|---|---|---|
| CN | 1341133 | 3/2002 |
| CN | 1741862 | 3/2006 |

(Continued)

OTHER PUBLICATIONS

"Standard Test Methods for Water Vapor Transmission of Materials", ASTM E96/E96M-15, retrived on Feb. 3, 2016.*

International Search Report dated Jan. 25, 2012 for Application Serial No. PCT/US2011/047312 filed Aug. 10, 2011.

Written Opinion dated Jan. 25, 2012 for Application Serial No. PCT/US2011/047312 filed Aug. 10, 2011.

(Continued)

*Primary Examiner* — Anish Desai

(74) *Attorney, Agent, or Firm* — Avery Dennison Retail Information Services, LLC

(57) ABSTRACT

The present invention relates to a breathable heat transfer label for breathable performance ware. The heat transfer label allows moisture and sweat to pass through and remove moisture from the skin surface to provide comfort to the wearer.

13 Claims, 6 Drawing Sheets

(56) References Cited

U.S. PATENT DOCUMENTS

| | | | | |
|---|---|---|---|---|
| 2003/0035933 | A1 | 2/2003 | Stahl | |
| 2003/0113548 | A1* | 6/2003 | Corzani et al. | 428/423.1 |
| 2004/0122161 | A1* | 6/2004 | Paul et al. | 524/558 |
| 2004/0146729 | A1* | 7/2004 | Ahmed et al. | 428/500 |
| 2005/0100689 | A1* | 5/2005 | He et al. | 428/32.79 |
| 2006/0089073 | A1 | 4/2006 | Sobieski | |
| 2006/0135013 | A1* | 6/2006 | Higashiguchi et al. | 442/150 |
| 2007/0235125 | A1* | 10/2007 | Doeling | 156/256 |
| 2010/0028587 | A1* | 2/2010 | Grotefend | 428/41.6 |
| 2010/0255270 | A1 | 10/2010 | Stuebiger | |
| 2011/0198024 | A1* | 8/2011 | Lorence et al. | 156/230 |
| 2011/0289647 | A1* | 12/2011 | Chiao et al. | 2/69 |
| 2015/0099099 | A1* | 4/2015 | Weedlun | B44C 1/1712<br>428/192 |

FOREIGN PATENT DOCUMENTS

| | | | |
|---|---|---|---|
| WO | 90/00969 | 2/1990 | |
| WO | 97/35290 | 9/1997 | |
| WO | 00/43433 | 7/2000 | |
| WO | 01/03941 | 1/2001 | |
| WO | 02/103108 | 12/2002 | |
| WO | 2004050262 | 6/2004 | |
| WO | WO 2009011177 A1 * | 1/2009 | C09J 175/04 |

OTHER PUBLICATIONS

EN Standard 343; 2003 from Proceedings for Nanotechnology and Smart Textiles for Industry, Lomax G.R., Sep. 2001.
J. Mater, Chem., 2007, 17, 2775-2784.

* cited by examiner

| | MVTR (g/m^2/24hrs) | | | | | |
|---|---|---|---|---|---|---|
| FABRIC | Bare fabric | Avery Dennison transfers | Fine dots | Medium dots | Coarse dots | Reference |
| IM # 392657 | 2581 | 137 | 489+/-98 | 480+/-25 | 462+/-23 | 830 |
| IM # 434779 | 3720 | 134 | 548+/-53 | 500+/-24 | 463+/-4 | 895 |
| IM # 448170 | 2462 | 135 | 537+/-22 | 498+/-14 | 494+/-32 | 776 |
| IM #442022 | 2428 | 160 | 573+/-7 | 526+/-3 | 486+/-11 | 803 |
| IM # 422486 | 2452 | 140 | 506+/-20 | 496+/-21 | 486+/-7 | 1112 |
| Spandex | 2502 | 170 | 507+/-18 | 460+/-17 | 449+/-34 | 727 |
| Expansion (on spandex) | | | 9.1+/-.1% | 9.3+/-.7% | 8.3+/-.2% | |

Figure 9

BREATHABLE HEAT TRANSFER LABELS

FIELD OF THE INVENTION

The present invention is in the field of heat transfer labels, and more particularly breathable heat transfer labels for textiles, and more particularly brand identification devices for performance apparel.

BACKGROUND OF THE INVENTION

Heat transfer labels have gained broad acceptance in the garment industry. Care labels, brand identifiers, graphical, numerical and other type of expressions used as decorations or for providing information for shirts, pants, sportswear, and personal identification labels are all examples of such current applications. Heat transfer labels have also been used broadly in other identification or personalization products such as caps, binders, shoes, tote bags, toys, consumer electronics, sports gear, etc. that are found in schools, sport activities, camps, gyms, and other places.

Heat transfer labels typically use hot melt or heat activated adhesives. Heat transfer labels typically use hot melt adhesives which become sticky at elevated temperature so as to enable application of the label to the substrate, but after cooling the transfer label can feel stiff or rough to the wearer at ambient temperature. This may be due to the fact that such adhesives are not breathable.

When such heat transfer labels are applied to highly breathable performance-ware (e.g. jerseys, sporting attire, athletic equipment, pads, etc.), the adhesives can prevent the labeled area from breathing, that is, air flow is restricted due to the spaces normally found in a woven tag or article being blocked or clogged with adhesive. Such labels thus cannot absorb moisture or perspiration and therefore perspiration or moisture cannot be wicked away from the skin, causing discomfort to the wearer and in some instances potentially causing rashes, blemishes or other skin irritations leading to consumer complaints. Throughout this disclosure, breathability refers to the ability of a fabric or label to permit moisture to be moved away from the wearer of the garment. Wicking refers to the phenomena of condensed water being absorbed by a fabric or a label and thus taken away from the skin surface.

Thus, there is a need for a breathable heat transfer label which allows moisture and perspiration to pass through the label and away from the surface of the wearer, particularly when such labels are used in performance apparel.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to a breathable heat transfer label. The heat transfer label when applied to breathable performance wear, will allow moisture, perspiration and water to pass through and away from the skin surface and provide comfort to the wearer and reduce consumer irritation.

In one exemplary embodiment of the presently described invention, a heat transfer label includes an indicia layer, and a heat transfer adhesive layer. The heat transfer label has a MVTR of at least 100 $g/m^2$/day when measured via ASTM E96 Procedure D.

In another exemplary embodiment of the presently described invention, a heat transfer label further includes at least one of the layers including a clear layer, a white layer, and a dye blocking layer.

In another exemplary embodiment of the presently described invention, a heat transfer label is constructed from one or more hydrophilic polymers.

In another exemplary embodiment of the presently described invention, the heat transfer adhesive is made of non-breathable polymer, and the adhesive layer is pattern printed with space between the adhesive material.

In a further exemplary embodiment of the presently described invention, a breathable polymer at least partially fills the space between the non-breathable polymers.

In a yet still further exemplary embodiment of the presently described invention, a brand identification device for performance apparel is provided and includes a heat transfer label having an indicia layer, and a heat transfer adhesive layer. The heat transfer label has a MVTR of at least 100 $g/m^2$/day.

In a still further exemplary embodiment of the presently described invention, a supply of brand identification devices for use with performance apparel is provided and includes a plurality of brand identification devices with each of the devices having an adhesive layer, a printing layer, and a dye blocking layer, with the adhesive layer including a non-breathable polymer. The supply of devices can be provided in a roll format, cut sheet or in a stack.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 9 is a table that plots the MVTR of bare breathable fabrics of regular Avery Dennison transfers bonded on the same fabrics and the MTV measured for the labels of the present design.

Unless otherwise indicated, the illustrations in the above figures are not necessarily drawn to scale.

DETAILED DESCRIPTION OF THE INVENTION

The devices, apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Publications, patents and patent applications are referred to throughout this disclosure. All references cited herein are hereby incorporated by reference.

All percentages and ratios are calculated by weight unless otherwise indicated. All percentages and ratios are calculated based on the total composition unless otherwise stated.

Unless otherwise noted, all component or composition levels are in reference to the active level of that component or composition, and are exclusive of impurities. For example, residual solvents or by-products, which may be present in commercially available sources.

Figure 8:
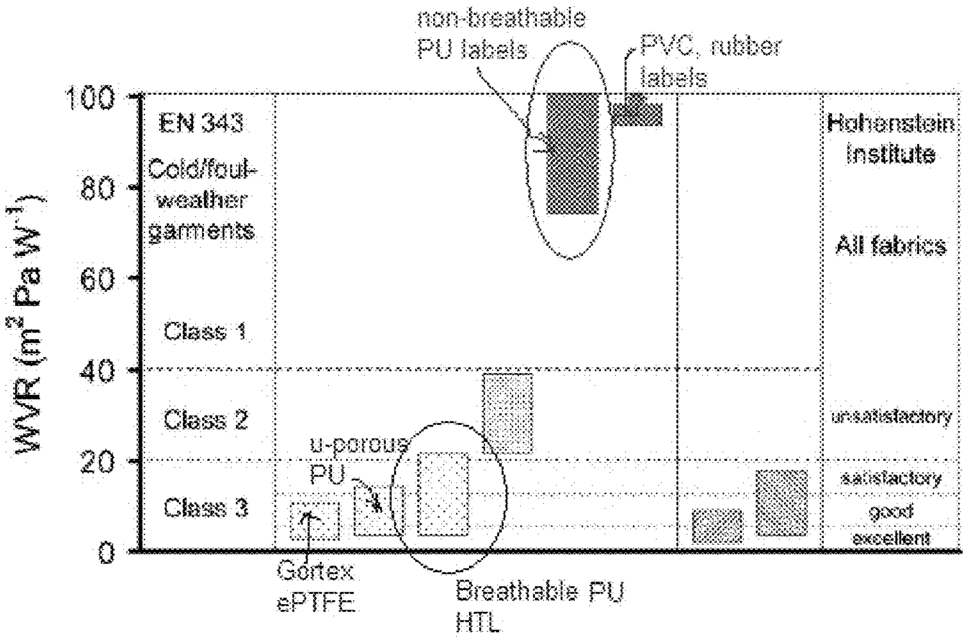
FIG. 8 is a chart that shows water vapor permeation resistance.

The present invention relates to a breathable heat transfer label. A measure of breathability is the moisture vapor transmission rate ("MVTR"). It represents the amount of water vapor that passes through a subject per unit area per day. FIG. 8 (taken from EN standard 343; 2003 from Proceedings for Nanotechnology and Smart Textiles for Industry, Lomax G. R. September 2001) illustrates water vapor permeation resistance as opposed to vapor transmission rate which is believed to be the same or similar to electrical resistivity vs. conductivity.

Figure 1:
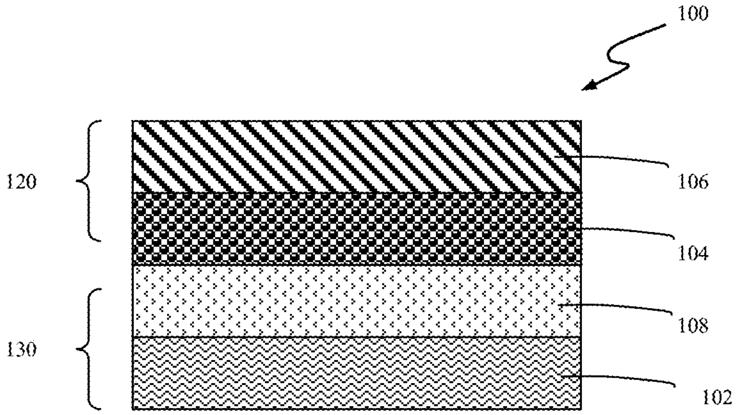
FIG. 1 is a sectional illustration of one exemplary embodiment of a heat transfer label according to the present invention.

Reference is now directed to FIG. 1, which provides a sectional view of an exemplary heat transfer label. The heat transfer label 100 has four layers: a layer of temporary support 102, a layer of indicia 104, a layer of heat transfer adhesive 106, and a release layer 108 in contact with the layer of indicia. Upon application onto a fabric, the label 100 is placed on the fabric with the heat transfer layer 106 in contact with the fabric. The label application process can be accomplished in any of a number of known labeling processes, direct attached, tip on, blown on, etc. and then secured.

Heat can be applied through the side of the temporary support 102. The temporary support 102 is then peeled off with the release layer 108 and leaving only the printed indicia 104 attached to the fabric surface through the adhesive 106. The temporary support 102 and the release layer 108 forms the support portion 130 of the label 100, which functions as carrier for the label 100 but does not get transferred to the fabric. The layer of indicia 104 and the layer of heat transfer adhesive 106 form the transfer portion 120 of the label 100, which will be transferred onto the fabric. Each layer in the transfer portion 120 of the label 100 needs to be breathable for a breathable brand identification device (tag or label) to be formed. Each layer in the support portion 130 does not necessarily need to be breathable as it does not get transferred to the fabric.

Figure 2:
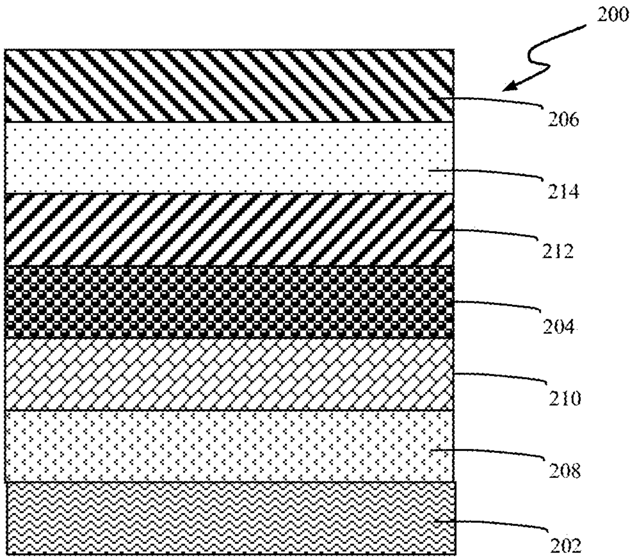
FIG. 2 is a sectional illustration of one exemplary embodiment of a heat transfer label according to the present invention.

The heat transfer label can further include at least one of the following layers in the transfer portion as illustrated in FIG. 2: a white layer 212 situated between the indicia 204 and the adhesive layer 206, a clear layer 210 situated between the indicia 204 and the release layer 208, and a clear layer 214 situated between the white layer 212 and the adhesive layer 206 when a white layer 212 is used. A white layer 212 can provide a contrasting background color for the indicia so that the appearance of the indicia is not offset significantly by the color of the fabric. A clear layer 210 can be used to protect the indicia layer 204 and modify adhesion of the indicia layer 204 to the release layer 208. Another clear layer 214 can be used to modify the adhesion between the adhesive layer 206 and the white layer 212.

The carrier film 202 provides mechanical strength for the label structure for ease of processing and handling. It also allows the label sheet to be rolled up or stacked for storage until further processing or attachment to the apparel item occurs. Paper or polymer films can be used as the carrier film. A preferred carrier film is thermally stabilized polymer film such as PET. A preferred thickness for the carrier film is 2 to 7 mil thick. It is more preferred to be 4 to 6 mil.

The release layer 208 is a low melting point material with suitable adhesion to the indicia layer 204 or clear coating 210 when used. Suitable adhesion means the indicia or clear coating can be deposited on the release layer but can also be separated from the release layer 208 in the heat transfer process. The release for the release layer 208 can be wax based material or silicone. It may further include a polymer binder and other additives such as matting agents. In situations where a wax is selected for the release, certain types of wax could contaminate the surface of the breathable label after the heat transfer occurs, hydrophilic wax is preferred. Preferred melting points for the wax is 70 to 150 C. It is more preferred to be 100 to 120 C. One example of hydrophilic wax is Unithox D-300, a non-ionic wax emulsion from Baker Petrolite that is 23.5% in solids. Another example is E6 Release available from Avery Dennison RIS division. The wax layer can be solvent or water based and can include the same set of additives as layers in the transfer portion of the label, to be discussed in detail later. The wax layer can be printed or coated. The thickness of wax release layer is between about 1 to about 10 microns but is more preferably between about 1 to about 5 microns.

Each layer of the heat transfer label that is attached to the article needs to have the breathability, that is, to allow moisture to penetrate through. The breathability comes from the use of polymers that can form a breathable film. Those polymers are hydrophilic in nature and form a monolithic film, that is, a film without microporous interconnected structures. The breathability of these hydrophilic polymers is the result of molecular water diffusion and conduction along the hydrophilic polymer side chain. This mechanism is described in detail in J. Mater. Chem., 2007, 17, 2775-

2784, which is incorporated by reference in its entirety. The hydrophilic polymers can also absorb condensed water and allow it to pass through the polymer film, a process commonly referred to as water wicking.

Breathable hydrophilic polymers include water based dispersions and solvent based dispersions. Examples of water based hydrophilic polymer dispersions include Permax 202, Permax 230, Permax 300, and Permax 803, all of which are from Lubrizol Corp. of Wickliffe, Ohio, USA. The preferred hydrophilic breathable polymers have polyalkyleneoxide grafted as side chains instead of the being part of the main backbone as described by Lubnin et al. in U.S. Pat. No. 6,897,281. Permax 230 is a non-ionic stabilized polyurethane dispersion with solid value of 33%. It has an MVTR value for the dried film of 500 g/m$^2$/day using the upright water cup (ASTM E-96B) and 4500 g/m$^2$/day using the inverted water cup (ASTM E-96BW). Permax 230 has also a melt viscosity that allows it to flow into the fabrics when molten at a temperature above 250° F., making it ideal for formulating breathable hot melt adhesives.

Examples of solvent based hydrophilic polymers include the breathable polyurethane SU-55-074 from Stahl Corp, which is a 30% solid solution in a toluene/IPA mixture. Such polymers can also be crosslinked via the urethane group using poly-isocyanates such as the HDI trimer Coronate HXLV from Nippon Polyurethane Industry Co. Preferred solvents for such polymers include propylene and di-propylene glycol.

Besides hydrophilic polymer, the formulation for each layer in the transfer portion further includes of a liquid carrier, and one or more of the following components: polymers, waxes, additives, pigments, etc. The additives include chemicals such as humectants, rheology modifiers, surface tension modifiers, leveling agents, release agents etc.

The liquid carrier can be water or solvent. Examples of suitable solvents include dipropyleneglycol dimethylether, dipropyleneglycol monomethylether, dipropyleneglycol monobutylether, dipropyleneglycol monomethylether acetate, gama butyrolactone, n-ethyl pyrolidinone etc. When water is used as a liquid carrier, it may still require the presence of a co-solvent to help the stability of the formulation. Suitable co-solvents include propylene glycol ethers, esters and ethylene glycol ether/esters. Examples of co-solvents include di-propylene glycol di-methyl ether, di-propylene glycol mono methyl ether, di-propylene glycol monobutylether, di-propylene glycol mono methyl ether acetate, and the mono propylene glycol series.

Humectants maintain the mobility and wetting of the formulation during processing. Examples of humectants include: mono-propylene glycol, di-propylene glycol, di-ethylene glycol, glycerol, etc or mixtures of glycols and waxes, such as Aqualube AQ54 from Nazdar Corp.

Rehology modifiers provide the suitable flow characteristics for the formulation. Newtonian or viscoelastic flow properties are preferred for the formulations. For screen-printing, the viscosities of the formulations are preferred to be from 10,000 cp to 100,000 cp. For other printing methods such as flexo or gravure, the viscosities of the formulations have to be in a lower range e.g. 5-250 cp and Newtonian flow property is preferred. Examples of rheology modifiers include associated hydrophilic polyurethanes such as DSX1415 from Cognis Corp., BorchiGel L75N from Borchers, or alkali-swellable thickeners such as UCAR Polyphobes 102 and 106 from Dow Chemical.

Surface tension modifiers or surfactants can be anionic or non-ionic. The preferred ones are non-ionic and non-fluorinated with low foaming ability. Examples of suitable surface tension modifiers include alkoxylated silicones such as TegoWet 270 from Tego—Degussa or BYK 319 from BYK Chemie, ethoxylated hydrocarbons such Triton CF-10 from Dow Chemical, or acetylene derived alcohols such as Surfynol 104E from Air Products and Chemicals, Inc.

Defoamers such as BYK 24, 28, 19 from BYK Chemie are used in the exemplary formulations set forth herein.

Pigments are important for the indicia layer 204 and white layer 212. Pigment pastes that are pre-dispersed in water or organic solvent are preferred. Examples of such pigments include Aurasperse series of pigment concentrates from BASF. Aurasperse W-308, for example, is a white $TiO_2$ concentrate with 71% solids. It can be used in the white background layer 212. Aurasperse W-7012 is a black pigment concentrated with 35% solids. It can be used in the black color ink of the color layer 204.

pH buffers could also be a part of the formulations. The role of the buffers is to keep the pH value of the formulation and prolong the pot life of the liquid ink by moderating the reactivity of the cross linker. The pH buffers are also used to control the rheology of the formulations when any form of alkali induced thickening is employed. A suitable pH buffer is DMAMP-80, an amino alcohol product from Dow Chemical that is an 80% solution of 2-Dimethylamino-2-Methyl-1-Propanol in water. DMAMP-80 could effectively thicken alkali-swellable thickeners such as UCAR Polyphobes 102 and 106 from Dow Chemical.

Referring back to FIG. 2, the optional clear layer 210 functions as a protective layer or varnish to give the label increased resistance to abrasion and scuffing effects. It also serves to tune the adhesion of the label to the supporting release layer 208. This layer should be deposited uniformly. The preferred thickness is about 1 to about 20 microns.

The indicia 204 is a color design layer functions to display the visual information of the label. This layer should be breathable but the breathability can be a function of the solid pigment content of the ink. Important for the color layer is the usage of color pigments vs. dyes as color carriers in the inks that offer improved resistance to environmental factors and no propensity to thermal sublimation. The preferred color carriers used in the indicia are the organic and inorganic pigments. The thickness of the indicia can be a function of pigment concentration (lower limits or minimal necessary achieving the required color density is preferred) and breathability (higher the better). The preferred thickness is about 10 to about 50 microns.

The white background layer 212 offers a contrasting background for the color design layer 204. This layer should be printed uniformly and be breathable. The preferred thickness is about 20 to about 200 microns. It has all the features of the color design layer and in addition requires an increased level of white pigmentation (>50% pigment in the solid film mix) as its masking power should overcome the background color of the fabric the label is bonded onto. The white background layer may be optional if the color of the fabric substrate is white. It is preferred to have this layer disregarding the color or nature of the fabric substrate to have a consistent background for the indicia. The preferred pigment for this layer is silica or alumina treated $TiO_2$ as they are also hydrophilic.

The optional clear layer 214 functions as a tie layer if the white background layer 212 does not offer satisfactory adhesion to the adhesive layer 206. This is especially required for some heavily $TiO_2$ loaded white formulation.

Adhesive layer 206 of this invention has to satisfy the following requirements: a) melt and flow in the fabrics texture between about 250-350° F. when heated up for 5 to about 50 seconds, b) have a suitable modulus to withstand high temperature wash tests required by some apparel manufacturers, and c) have suitable adhesion to synthetic fibers. The adhesive thickness can range between about 20 and about 500 microns.

As the adhesive layer will be in contact with the fabric after the heat transfer process, and therefore hidden behind the indicia layer and other layers when used, there are two methods to make this layer breathable: through the use of a breathable hot melt adhesive, or through pattern printing of a hot melt adhesive that is not breathable, or the combination of both. When using pattern printing, the adhesive is deposited at discrete locations, leaving space between adhesives so that moisture or condensed water can pass through. Breathable adhesive can be used to at least partially fill up the space between the non-breathable adhesives. Examples of commercial non-breathable hot melt adhesives for fabric transfers include Adhesive LT series, Adhesive 1 and Adhesive 3, all products of Avery Dennison RIS division.

Figure 4:
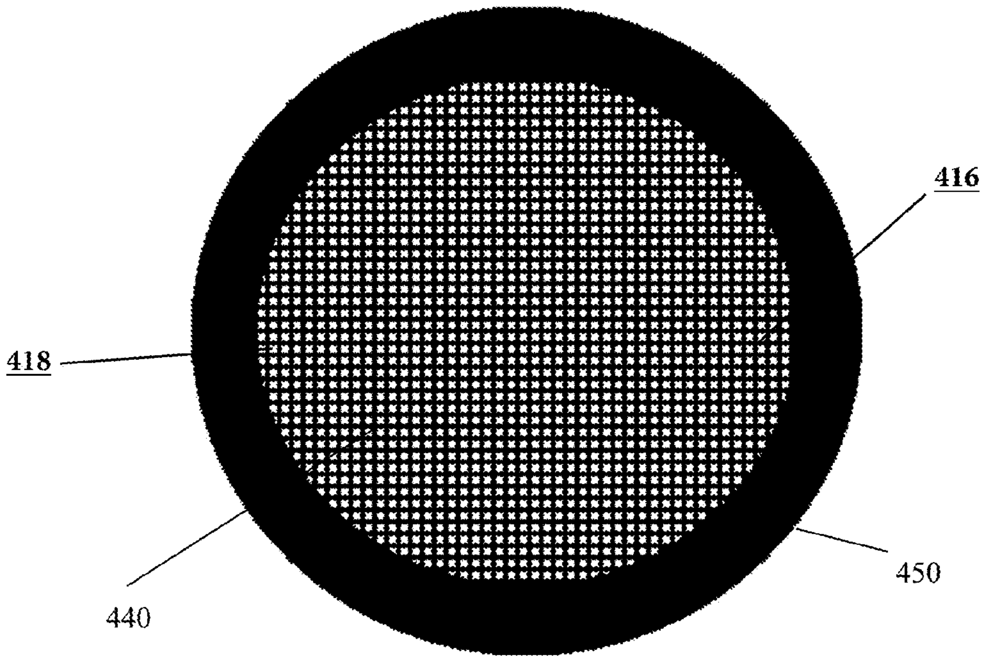
FIG. 4 illustrates the top view of an exemplary embodiment of a pattern printed layer according to the present invention.

FIG. 4 (need reference numerals) illustrates an exemplary pattern printed adhesive layer. The non-breathable adhesives are deposited in a grid structure 440, and also as the frame of the label 450. The voids between the grid lines are big enough so that after the heat transfer process, they are not filled up by the non-breathable adhesive. The voids can be replaced at least partially with a breathable adhesive as well. The printed patterns of the two adhesives may overlap or contact each other or may also leave air gaps. The pattern is not limited to the grid structure 440. Any pattern that can provide sufficient adhesion and also enough space to allow moisture to go through are acceptable.

The hydrophilic polymers such as the ones used in this invention will swell when wet, that is, they expand in volume. The swell effect is integral to the water wicking mechanism, yet could have an adverse effect on the label esthetics with a curled, puffed look. This is especially obvious when one layer of the label swells considerably more than others, or more than the stretchability of the fabric substrate allows. Another problem of the swelling is that it weakens the mechanical properties of the layer.

The water swelling of the hydrophilic breathable polymer layers can be controlled by the following methods: cross-linking of the polymers, mixing with other non-breathable more rigid polymers, pattern printing of a non-breathable layer under the breathable polymer layer, or combinations of the above.

The addition of one of several crosslinkers can decrease the amount of water swelling of the hydrophilic polymers and enhances the mechanical properties of the layers. In this case, aside from non-ionic hydrophilic side-chains (e.g. polyalkyleneoxide), the preferred hydrophilic breathable polymers also contain chemical moieties that make them feasible to crosslink reactions. One such moiety is the carboxyl group that can react in crosslink reactions with polyaziridine (such as XR2500 from Stahl Corp. or Xama 7 from Lubrizol), water dispersable polyisocyanates such as the Bayhydur series (Bayhydur 301, 302, 303, XP2487 etc) from Bayer MaterialScience LLC, or polycarbodiimides such as Carbodilite V-04 from Nisshinbo Industries Inc. Japan etc.

Mixing with other non-breathable more mechanically rigid polymers that are also cross-linkable can improve the strength of the polymer layer and make it more resistant to swelling. Non hydrophilic polymers that can be mixed with the hydrophilic polyurethanes such as Permax include acrylics, polyurethanes (PU), rubber emulsions (polystyrene butadiene), etc. Preferred examples include water based PU such as Hauthane L-2985 and Hauthane L-2337 from Hathaway Corp. Other preferred polymers include the high solid polyurethanes of BIP (Oldbury) Limited such as Beetafin L9027, a polyester derived polyurethane dispersion having a solid concentration of 60%. Beetafin polyurethanes from the L9000 series are also very effective hot melt adhesives in particular with high adhesion to synthetic fibers.

Figure 3:
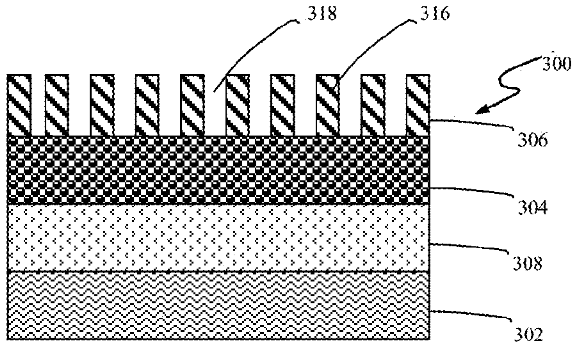
FIG. 3 is a sectional illustration of one exemplary embodiment of a heat transfer label according to the present invention.

When pattern printing a non-breathable polymers under the breathable hydrophilic layer, this non-breathable layer restrict the swelling caused deformation of the breathable layer. Referring now to FIG. 3, a breathable heat transfer label has a layer of temporary support 302, a layer of indicia 304, a layer of heat transfer adhesive 306, and a release layer 308 in contact with the layer of indicia. In the adhesive layer 306, a discontinuous non-breathable material 316 and another discontinuous breathable material 318 are deposited in a discrete pattern. In an alternative example of the invention, the breathable material 318 can be replaced with air.

FIG. 4 is a top view of the adhesive layer. The non-breathable material 416 forms a grid structure within the label as well as a frame around the edge of the label. Breathable material or void 418 is between the grid lines.

An optional die blocking layer may be needed when labeling a fabric containing thermal sublimation dyes. The thermal sublimation dye will migrate through the adhesive layer into the white layer or the indicia layer when heated during the thermal transfer process. This causes the color of the white layer or the indicia layer to be contaminated. In this case, a dye blocking layer will stop the thermal sublimation dye from contaminating the white layer or the indicia layer. Commercial dye barriers for heat transfer labels are based on inks pigmented with activated carbon. However these inks also have barrier properties against the water vapors. To maintain the breathability of the label, the dye blocking layer is pattern printed with air gaps between discrete dye blocking material.

Figure 5:
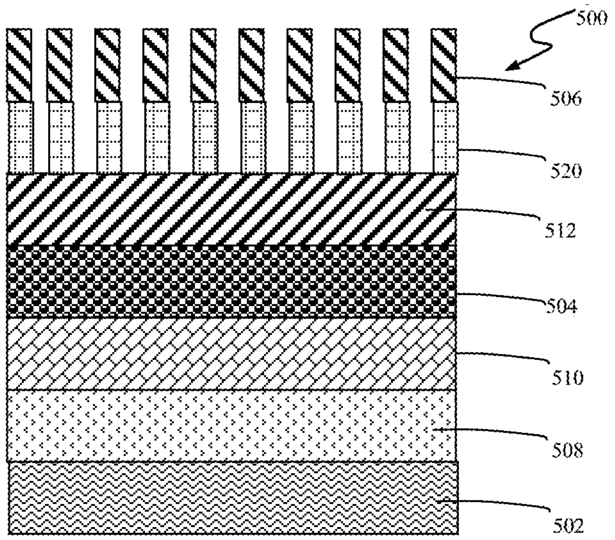
FIG. 5 is a sectional illustration of one exemplary embodiment of a heat transfer label according to the present invention.

FIG. 5 illustrate the cross sectional view of such a label. The label includes a carrier layer 502, a release layer 508, a clear layer 510, an indicia layer 504, a white layer 512, a dye blocking layer 520 and an adhesive layer 506. The adhesive layer 506 is pattern deposited. And the dye blocking layer 520 is also pattern deposited. The pattern of these layers can be the same or different from the one used for the adhesive layer.

According to the coverage of the material, each layer can be deposited as one of the following three patterns:

(a) Continuous flood—the printed area is limited by the outer label perimeter. Layers printed in this way need to be breathable and include the white layer 212, the clear layer 214 and 210, and the continuous breathable adhesive 206.

(b) Discrete pattern—a repetitive pattern is printed. Air gap exists between the printed pattern entities. This is essential especially when non-breathable polymers are printed as the air gap allows the breathability through the layer so the label can be breathable. Discrete artwork pattern is the preferred method for printing non-breathable polymers while is less preferred when printing only breathable formulations.

(c) Intermix pattern—repetitive patterns are printed using a breathable polymer in one area and using non-breathable polymer in other areas. The two polymers are inter-digitated and printed on the same plane (side by side or near). The two adhesive formulations can contact each other or they could leave a gap between them. FIG. 3 and FIG. 5 illustrate a design that the breathable adhesives are printed as artwork patterns in between the patterns of a non-breathable adhesive.

It has been found that different patterns can produce different levels of performance, namely the wicking away of moisture or perspiration. By providing an air gap or lack of coverage in the adhesive (coating etc.) increases in breathability occur.

FIG. 9 plots the bare breathable fabrics, of regular Avery Dennison transfers (eco-stretch non-breathable) bonded on the same fabrics and the MVTR measured for the labels of this design (see FIG. 3). The fine dots adhesive print have 61% coverage, medium dot has 79% and coarse dot has 81%. While the coverage vs. breathability trend could be followed most numbers are within the standard deviation. MVTR data is measured according to ASTM E96, Procedure D—Water Method at 32.2 C.

Each layer in the transfer portion of the label is preferred to be printed or coated. The printing method of choice is screen printing but other printing methods are considered possible such as gravure or flexo. Some layers such as the white layer can also be applied via extrusion. Examples of coating methods include meyer rod, die, air knife and roll. The label can be further processed via die cutting, roll cutting or digital plotter cutting to have the final shape.

Figure 6:
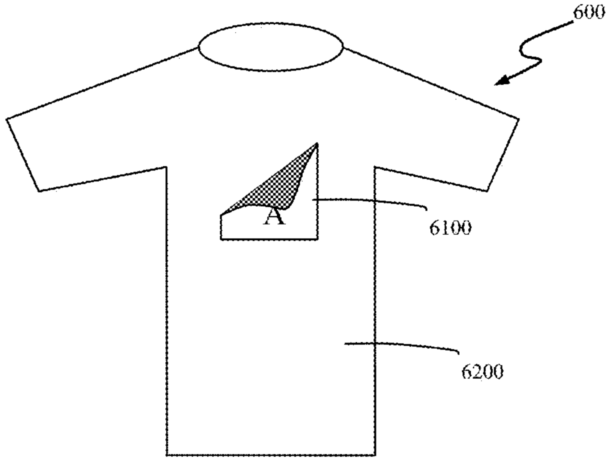
FIG. 6 provides an illustration of a brand identification device attached to an item of performance apparel.

FIG. 6 shows a brand identification device 6100 attached to a central panel 6200 of a performance article 600. While the brand identification device is shown connected to a front panel 6200 such as a shirt or jersey, the brand identification device can be provided on an internal seam of the article, collar, other internal area, back panel, sleeve, etc. of the article.

Figure 7:
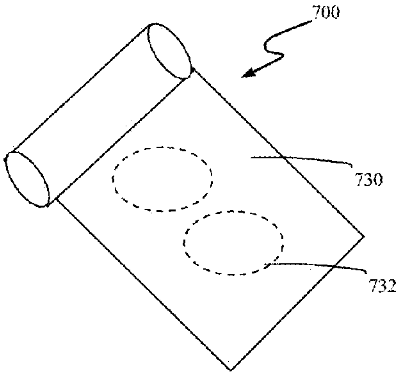
FIG. 7 shows a supply of brand identification devices.
Figure 7A:
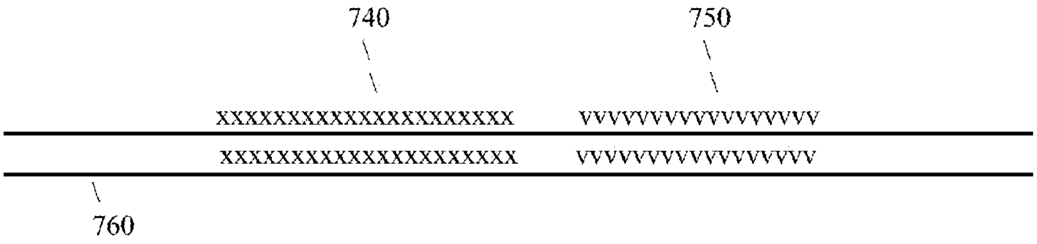
FIG. 7A illustrates an alternate supply of a supply of brand identification devices.

FIG. 7 and FIG. 7A provides a supply 700 of brand identification devices in which in some embodiments, the supply 700 can be provided in a continuous or roll format and in other instances provided in a cut sheet or stacked configuration. The supply 700, here shown as a roll of material, includes a carrier or substrate 730 having a plurality of heat transfer labels 732 shown provided on the carrier.

FIG. 7A shows a cut sheet stack of heat transfer labels in which two different types of heat transfer labels 740 and 750 are provided on a carrier sheet 760 in a stack. The sheets are successively removed from the stack and attached to the particular article. Each of labels 740 and 750 may be provided with different indicia, colors, shapes, configurations or constructions.

The MVTR of such label devices ranges from 400 to 900 g/m2/day when tested via ASTM E96 Procedure D.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A breathable heat transfer label for labeling a fabric, comprising:

a heat transfer adhesive layer having a breathable polymer; and an indicia layer situated below the heat transfer adhesive layer, the indicia layer comprising a pigment; wherein the indicia layer is between 10 and 50 microns in thickness to provide breathability to the indicia layer;

wherein the heat transfer label has a moisture vapor transmission rate (MVTR) of at least 100 $g/m^2$/day when measured in accordance with ASTM E96 Procedure D and at least one layer selected from a group including:

a white layer situated between the indicia layer and the adhesive layer, and a dye blocking layer situated between the indicia layer and the adhesive layer, or situated between the white layer and the adhesive layer; wherein the label further comprises a non-breathable adhesive, wherein the non-breathable adhesive is pattern printed with spaces between the non-breathable adhesive.

2. The heat transfer label of claim 1, wherein the breathable polymer is hydrophilic.

3. The heat transfer label of claim 1, wherein the heat transfer adhesive layer having a breathable polymer at least partially fills the spaces between the non-breathable adhesive.

4. The heat transfer label of claim 1, wherein the breathable polymer is mixed with a non-breathable polymer.

5. The heat transfer label of claim 2, wherein the breathable polymer is a water based dispersion or a solvent based dispersion.

6. The heat transfer label of claim 4, wherein the non-breathable polymer is an acrylic.

7. The heat transfer label of claim 4, wherein the non-breathable polymer is a rubber emulsion.

8. The heat transfer label of claim 1, wherein the non-breathable adhesive further forms a grid structure within the label and a frame around the edge of the label and the heat transfer adhesive layer having a breathable polymer is deposited in spaces in the grid structure.

9. The heat transfer label of claim 1, wherein the label further comprises a release layer situated below the indicia layer.

10. The heat transfer label of claim 9, wherein the release layer is a wax having a melting point of 70 to 150° C.

11. The heat transfer label of claim 10, wherein a release for the release layer is a wax based material or silicone.

12. The heat transfer label of claim 2, wherein the hydrophilic breathable polymer contains chemical moieties.

13. A performance apparel item, comprising:

a performance apparel item;

a brand identification device comprising;

a heat transfer adhesive layer having a breathable polymer that is a water based dispersion; and an indicia layer situated below the heat transfer adhesive layer, the indicia layer comprising a pigment; wherein the indicia layer is between 10 and 50 microns in thickness to provide breathability to the indicia layer;

wherein the brand identification device is attached to the performance apparel item and has a moisture vapor transmission rate (MVTR) of at least 100 $g/m^2$/day in accordance with ASTM E96 procedure D, wherein the brand identification device further comprising a non-breathable adhesive, wherein the non-breathable adhesive is pattern printed with spaces between the non-breathable adhesive.

* * * * *